United States Patent [19]

Wakui

[11] Patent Number: 5,532,740
[45] Date of Patent: Jul. 2, 1996

[54] IMAGE-DATA RECORDING DEVICE AND IMAGE-REPRODUCTION DEVICE FOR AN ELECTRONIC STILL CAMERA

[75] Inventor: Yoshio Wakui, Itabashi, Japan

[73] Assignee: Asahi Kogaku Kogyo Kabushiki Kaisha, Tokyo, Japan

[21] Appl. No.: 401,116

[22] Filed: Mar. 9, 1995

[30] Foreign Application Priority Data

Mar. 10, 1994 [JP] Japan ................................ 6-066598

[51] Int. Cl.$^6$ ................................................. H04N 5/76
[52] U.S. Cl. ........................... 348/231; 348/233; 348/240; 358/909.1; 358/906
[58] Field of Search .................................... 348/222, 231, 348/233, 239, 240; 358/909.1, 906; H04N 5/228, 5/76, 5/262

[56] References Cited

U.S. PATENT DOCUMENTS 5,093,731  3/1992  Watanabe ................................ 358/906
5,153,729  10/1992  Saito ........................................ 348/233
5,226,145  7/1993  Moronaga ............................... 348/231

Primary Examiner—Safet Metjahic
Assistant Examiner—Sherrie Hsia
Attorney, Agent, or Firm—Greenblum & Bernstein

[57] ABSTRACT

A recording device is incorporated in an electronic still camera for recording image data derived from an optical image of a moving object to be photographed, in a suitable memory at regular predetermined time intervals. A series of recording areas are set in the over-writable memory to record a series of image data derived from the images to be photographed, and the device comprises a release switch for initiating recording of the image data in the recording areas of the memory by switching the release switch ON, in such a manner that the image data are successively stored in the recording areas of the memory in order. The recording of the image data in the memory is repeated in an endless manner until the release switch is switched OFF.

18 Claims, 5 Drawing Sheets

IMAGE-DATA RECORDING DEVICE AND IMAGE-REPRODUCTION DEVICE FOR AN ELECTRONIC STILL CAMERA

BACKGROUND OF THE INVENTION

1. Field of the Invention

The present invention generally relates to an electronic still camera for electronically photographing an image. More particularly, it relates to a recording device, used in an electronic still camera, for recording image data derived from a moving object to be photographed in a suitable memory means at regular predetermined time intervals, and to a reproduction device for reproducing an image from image data recorded in a suitable recording medium by such a recording device.

2. Description of the Related Art

In a conventional electronic still camera, photographing is frequently performed in a continuous mode to obtain an instantaneous image of a moving object such as an image of a bird, for example, rising in the sky. In the electronic still camera, a user can continuously monitor a moving image to be photographed by switching a power ON/OFF switch to the ON position, and continuous-mode photographing is initiated by switching a release switch ON so that a series of images are recorded at regular intervals of a given time (usually 1/60 of a second) in a suitable over-writable memory means, such as a floppy disc, an IC memory card or the like. However, because of the limited number of recordable areas of the recording medium, during the continuous-mode photographing operation, the continuous-mode photographing operation cannot be continued if the recordable areas are entirely used. Therefore, even if the user continuously monitors the variable image, many opportunities for obtaining the best image may be missed.

SUMMARY OF THE INVENTION

Therefore, an object of the present invention is to provide a recording device, used in an electronic still camera, for recording image data derived from a series of images of objects to be photographed, in a suitable over-writable memory means at regular predetermined time intervals. The device being constituted such that a continuous mode of photographing can be more easily executed to obtain a series of electronic photographs of desirable images without missing the best photographing opportunities.

Another object of the present invention is to provide a reproduction device for reproducing an image from image data recorded in a suitable over-writable memory means by such a recording device.

In accordance with an aspect of the present invention, there is provided a recording device, used in an electronic still camera, for recording image data derived from images of moving objects to be photographed, in a suitable over-writable memory means at regular predetermined time intervals. The device comprising: means for setting a series of recording areas in the memory means; means for initiating a recording of image data in the recording areas of the memory means by switching the switching means ON, in such a manner that the image data are successively stored in the recording areas of the memory in order; and means for repeating the recording of the image data in the memory means in an endless manner until the switching means is switched OFF.

The recording device may further comprise means for numbering the recording areas of the over-writable memory means in the order of the recording of the image data therein. In this case, the recording area in which the image data is recorded just after the switching means is switched OFF, may be defined as the newest recording area, and the recording area next to the newest recording area may be defined as the oldest recording area.

The recording device may further comprise means for writing reproduction-starting information data in the oldest recording area, whereby reproduction of the image is initially carried out on the basis of the image data stored in the oldest recording area. Furthermore, the recording device may comprise means for compressing the image data before it is stored in the recording area of the over-writable memory means. The over-writable memory means preferably comprises an IC memory card including an image-data storing section and a file header section.

In accordance with another aspect of the present invention, there is provided a reproduction device for reproducing an image on the basis of image data recorded in a suitable over-writable memory means by a recording device as mentioned above, the device comprising: means for reading out the image data from the recording areas of the memory means in the order of the recording of the image data therein; and, means for processing the read-out image data for successively reproducing a series of images on the basis of the processed image data.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
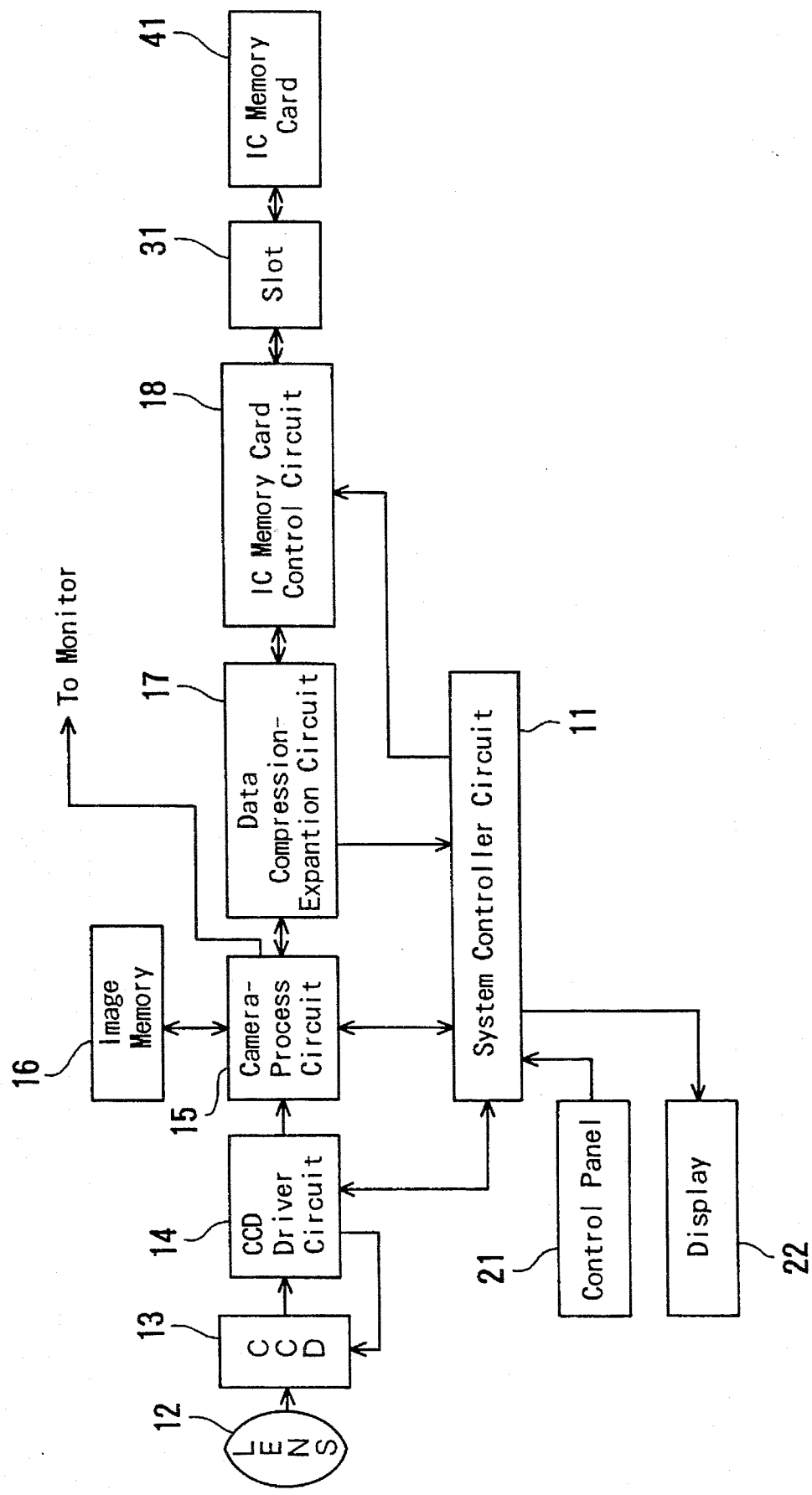
FIG. 1 is a block diagram of an electronic still camera into which an image-data recording device and an image-reproduction device according to an aspect of the present invention are incorporated.

FIG. 1 shows a block diagram of an electronic still camera according to the present invention. In this drawing, reference numeral 11 indicates a system controller circuit including a microcomputer for controlling the operation of the electronic still camera. The system controller circuit 11 is connected to a control panel 21 which includes various switches such as a power ON/OFF switch, a release switch, a mode selection switch, etc., through which various commands are inputted to the system controller circuit 11 by a user. Also, the system controller circuit 11 is connected to a monitor 22 such as an LED monitor for displaying a command inputted by the user through the control panel 21.

The camera comprises a photographic lens 12 by which an object to be photographed is optically detected. The image of the object to be photographed is focused on a light receiving surface of a charge transfer imaging device or CCD image sensor 13 by the photographic lens 12. When the power ON/OFF switch of the control panel 21 is switched ON, the CCD image sensor 13 converts the optical image into video signals, comprising red video signals (R-signals), green video signals (G-signals), and blue video signals (B-signals).

The video signals are read out from the CCD image sensor 13 by a CCD driver circuit 14, and it usually takes 1/60 of a second to complete the reading of all of the video signals obtained from a frame image defined by the CCD image sensor 13. The video signals read out from the CCD image sensor 13 are fed to the camera-process circuit 15, which includes analog-digital-converters (A/D). The video signals are subjected to automatic gain control (AGC), gamma correction, etc., in the camera process circuit 15, and are then converted into digital image data by the analog-digital-converters (A/D) included therein. The converted digital image data are temporarily stored in an image memory 16 in accordance with a predetermined format. The temporarily stored digital color image data are read out from the image memory 16, and are processed to produce luminance signals (Y) and differential color signals (Pr, Pb) in the camera-process circuit 15. These signals are fed from the camera-process circuit 15 to a monitor (not shown) such as an LCD (Liquid Crystal Display) monitor to reproduce the image. Namely, while the power ON/OF switch of the control panel 21 is switched ON, the image to be photographed is displayed on the monitor, and can be watched by the user. Note, the reproduction of the image by the monitor may be performed at regular intervals of 1/60 of a second.

The mode selection switch of the control panel 21 is used to select one of three photographing modes: a single-normal mode; a normal continuous mode; and an endless continuous mode. The single-normal mode and the normal continuous mode are well known in by those skilled in the art and the present invention is directed to the endless continuous mode as stated in detail hereinafter.

When the single-normal mode is selected, photographing is carried out by switching the release switch ON. In particular, just after the release switch of the control panel 21 is switched ON, video data temporarily stored in the image memory 16 is fed to a data compression/expansion circuit 17, and are compressed at a pre-selected compression ratio. Then, the compressed video data are recorded in an IC memory card 41 inserted into a slot 31, through an IC memory card control circuit 18. Thus, electronic photographing of the object is carried out.

The control panel 21 also includes a compression-ratio selection switch for selecting one of several compression ratio settings, and the recording of the video data in the IC memory card 41 is carried out at a compression ratio setting selected by the user. Although the IC memory card 41 has a fixed capacity, the effective capacity thereof is variable in accordance with the compression ratio setting selected by the user. Namely, the higher the compression ratio, the larger the effective capacity of the IC memory card 41, and vice versa. When one of the compression ratio settings is selected by the user, the possible number of recording areas to be defined in the IC memory card 41 is calculated and displayed on the monitor 22. Video data derived from an image of an object to be photographed is recorded in one of the recording areas defined in the IC memory card 41.

Figure 2:
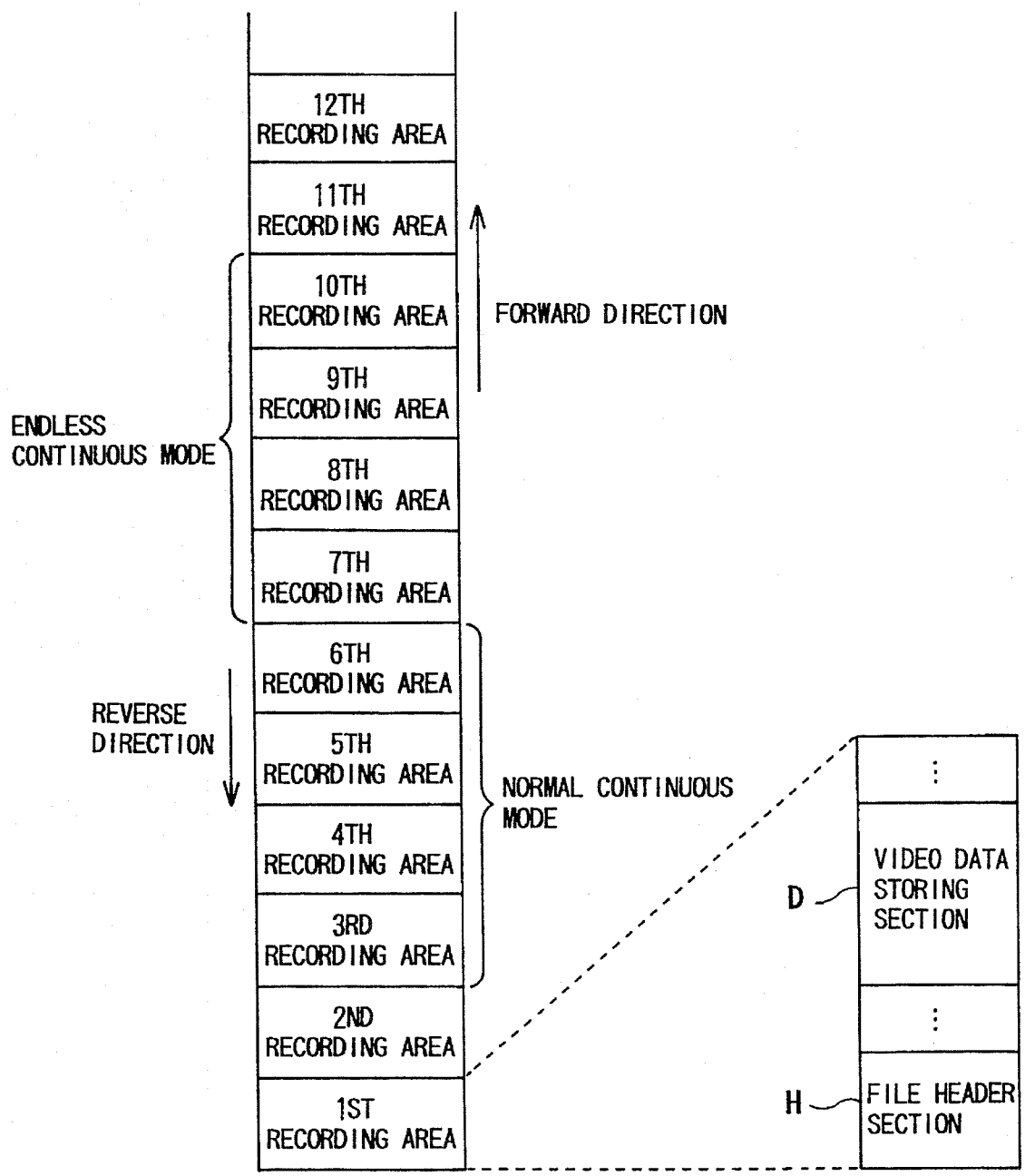
FIG. 2 is a diagrammatic view showing recording areas included in an IC memory card used in the camera.

FIG. 2 diagrammatically shows recording areas defined in the IC memory card 41. As shown in this drawing, each of the recording areas includes a video-data storing section (D) and a file header section (H). The video-data recording section D is used to store video data derived from a photograph image. The file header memory section H is defined as a user's section in accordance with the format regulated by Japan Electric Industries Development Association (JEIDA), and is used to store various information data as mentioned hereinafter in detail.

In an example shown in FIG. 2, each of the first and second recording areas stores compressed video data derived from an image photographed in the single-normal mode; a series of third, fourth, fifth, and sixth recording areas store compressed video data derived from images photographed in the normal continuous mode; a series of seventh, eighth, ninth, and tenth recording areas store compressed video data derived from images photographed in the endless continuous mode; an eleventh recording area stores a compressed video data derived from an image photographed in the single-normal mode; and the twelfth recording area and the remaining recording areas are blank. Namely, whenever the recording of compressed video data in the recording areas is done, the recording areas are sequentially numbered in order.

In the series comprising the third, fourth, fifth, and sixth recording areas storing the compressed video data derived from images photographed in the normal continuous mode, the third recording area is defined as the minimally-numbered one, and the sixth recording area is defined as the maximally-numbered one. Similarly, in the series comprising the seventh, eighth, ninth, and tenth recording areas storing the compressed video data derived from images photographed in the endless continuous mode, the seventh recording is defined as the minimally-numbered one, and the tenth recording areas is defined as the maximally-numbered one.

Figure 3:
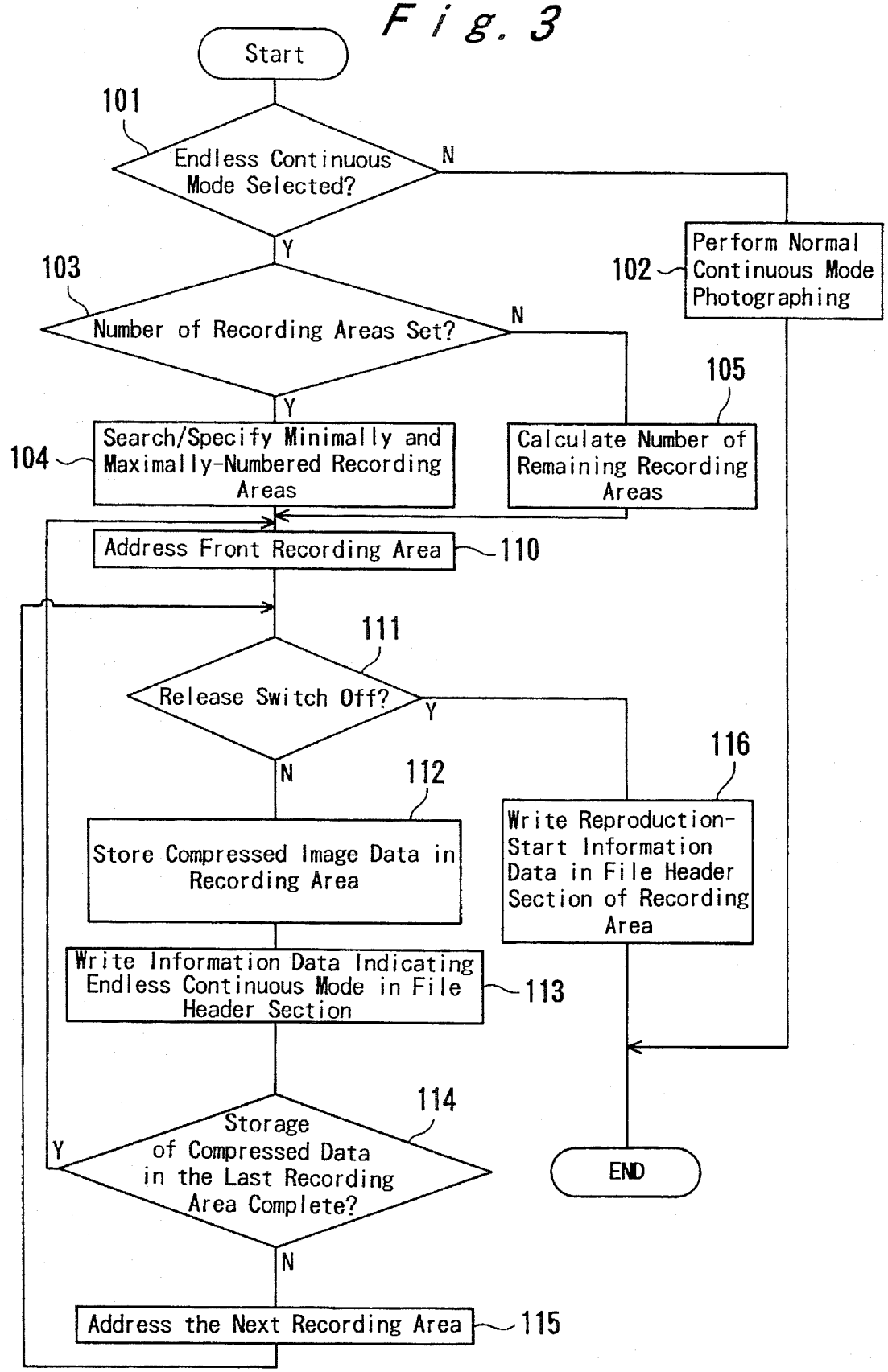
FIG. 3 is a flow chart of a photographing operation in either a normal continuous mode or an endless continuous mode, using the camera shown in FIG. 1.

FIG. 3 shows a flow chart for electronically photographing in either the normal continuous mode or the endless continuous mode, and the process of this flow chart is executed by switching the release switch ON.

At step 101 it is determined whether the endless continuous mode or the normal continuous mode is selected. If the normal continuous mode is selected, control proceeds to step 102, where normal continuous-mode photographing is carried out. In particular, as soon as the release switch on control panel 21 is switched ON, video data temporarily stored in the image memory 16 are successively fed at intervals of 1/60 of a second therefrom to the data compression-expansion circuit 17, and are compressed at the pre-selected compression ratio. Then, the compressed video data are successively recorded in recording areas defined in the IC memory card 41, through the IC memory card control circuit 18. For example, as shown in FIG. 2, the compressed video data are successively recorded in the third, fourth, fifth, and sixth recording areas.

Note that the control panel 21 further includes a number-setting switch for setting a number of recording areas to be used in normal continuous-mode and endless continuous-mode photographing. Also, note that information data indicating the continuous-mode photographing are written in each of the file header sections H of the recording areas used in normal continuous-mode and endless continuous-mode photographing.

If the endless continuous mode is selected, control proceeds from step 101 to step 103, where it is determined whether the number of recording areas to be used in the endless continuous-mode photographing has been set by the number-setting switch of the control panel 21. When the number of the recording areas to be used in the endless continuous-mode photographing is set, control proceeds to step 104, at which the minimally and maximally-numbered recording areas are searched and specified from among the recording areas to be used. On the other hand, when the number of the recording areas to be used in the endless continuous-mode photographing is not set, control proceeds to step 105, at which the number of remaining recording areas in the IC memory card 41 is calculated, and the minimally and maximally-numbered recording areas are determined. Of course, the remaining recording areas are used for the endless continuous-mode photographing.

At step 110, the minimally-numbered recording area is addressed such that compressed video data derived from an image of an object to be photographed can be stored therein. Then, control proceeds to step 111, where it is determined whether the release switch of the control panel 21 has been switched OFF. If the release switch of the control panel 21 is switched ON, control proceeds to step 112, at which compressed video data are stored in the minimally-numbered recording area (corresponding to the seventh recording area shown in FIG. 2). Then, at step 113, information data indicating continuous-mode photographing is written in the file header section H of the recording area.

At step 114, it is determined whether storage of compressed video data in the maximally-numbered recording area has been completed. If storage of the compressed video data in the maximally-numbered recording area has not been completed, control proceeds to step 115,and the next recording area (corresponding to the eighth recording area) is addressed for storage of compressed video data derived from the next image of an object to be photographed. Then, control returns to step 111. If the release switch is switched ON, storage of compressed image data in the next recording area is carried out at step 112. Namely, steps 111,112,113, 114, and 115 are repeated until storage of the compressed image data in the maximally-numbered recording area is completed. If storage of the compressed video data in the maximally-numbered recording area is complete, control proceeds from step 114 to step 110. Thus, storage of compressed image data in the recording areas is endlessly repeated as long as the release switch of the control panel 21 is switched ON.

If the release switch of the control panel 21 is switched OFF by a user, control proceeds from step 111 to step 116, where reproduction-starting information data are written in the file header section H of the recording area next to the recording area in which compressed image data are stored just after the release switch of the control panel 21 is switched OFF. The recording area in which compressed image data are stored just after the release switch of the control panel 21 is switched OFF is defined as the newest one because that compressed image data are newest. Also, the recording area next to the newest recording area is defined as the oldest one because the compressed image data included therein is oldest. Namely, the reproduction-starting information data are written in the file header section H of the oldest recording area. For example, in the example shown in FIG. 2, when a compressed image data are stored in the eighth recording area just after the release switch is switched OFF, the reproduction-starting information data are written in the file header section H of the ninth, or oldest recording area, next to the eighth, or newest recording area.

As is apparent from the foregoing, in endless continuous-mode photographing, the user can monitor images to be photographed by keeping the release switch ON, and thus it is possible for him to photograph desirable images by switching the release switch OFF, without losing the best photographing opportunities.

Figure 4:
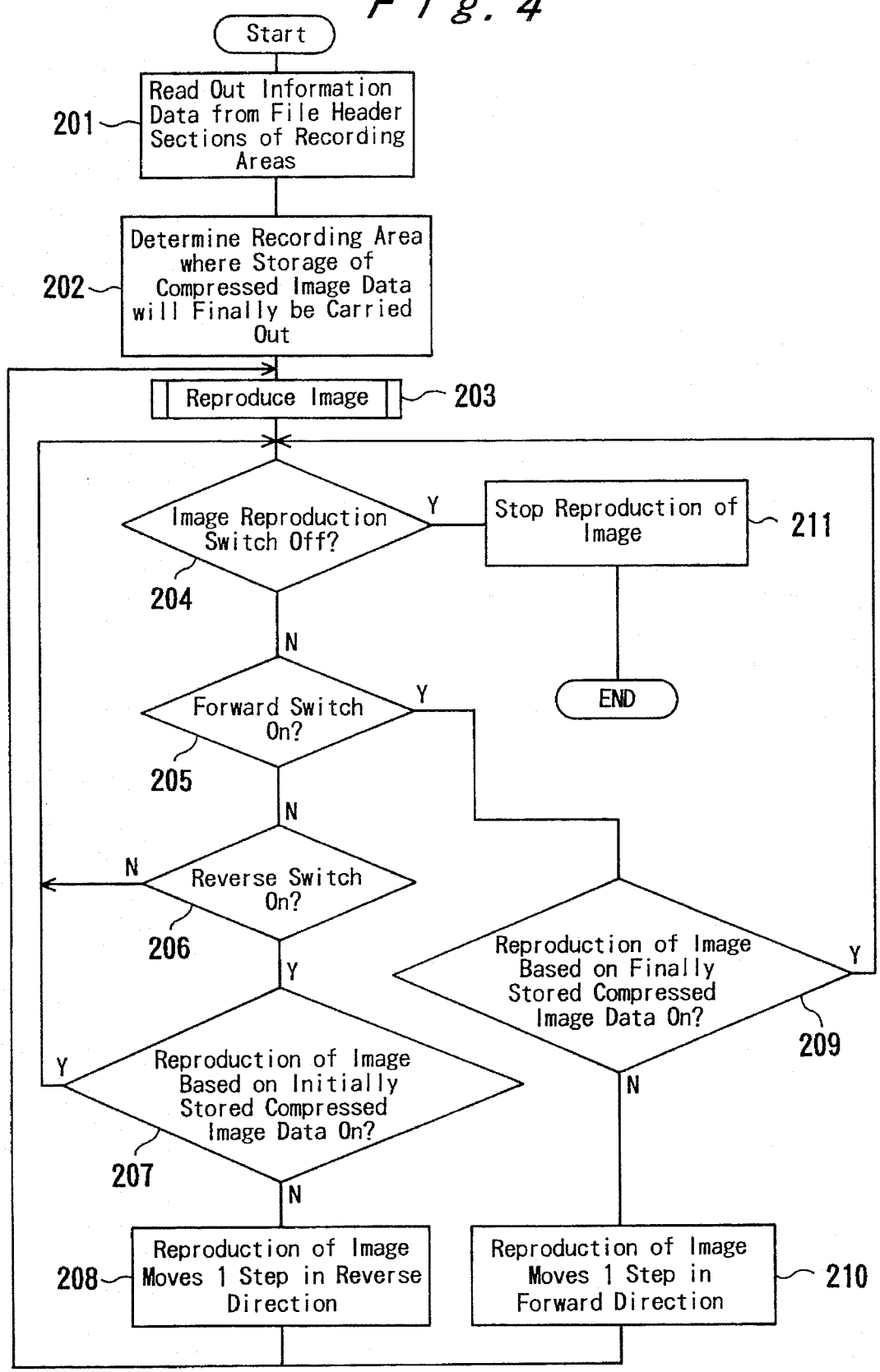
FIG. 4 is a flow chart of an image reproducing operation performed on the basis of compressed video data stored in the IC memory card.

FIG. 4 shows a flow chart for reproducing images on the basis of the compressed image data stored in the IC memory card 41. Note that the control panel 21 includes an image-reproduction switch, and the flow chart is executed by switching the image-reproduction switch ON.

At step 201, the various information data are read out from the file header sections H of all of the recording areas where each of the compressed image data are stored. At step 202, the recording area in which the storage of the compressed image data are finally carried out is searched and specified. In the example shown in FIG. 2, the eleventh recording area corresponds to the recording area concerned.

Figure 5:
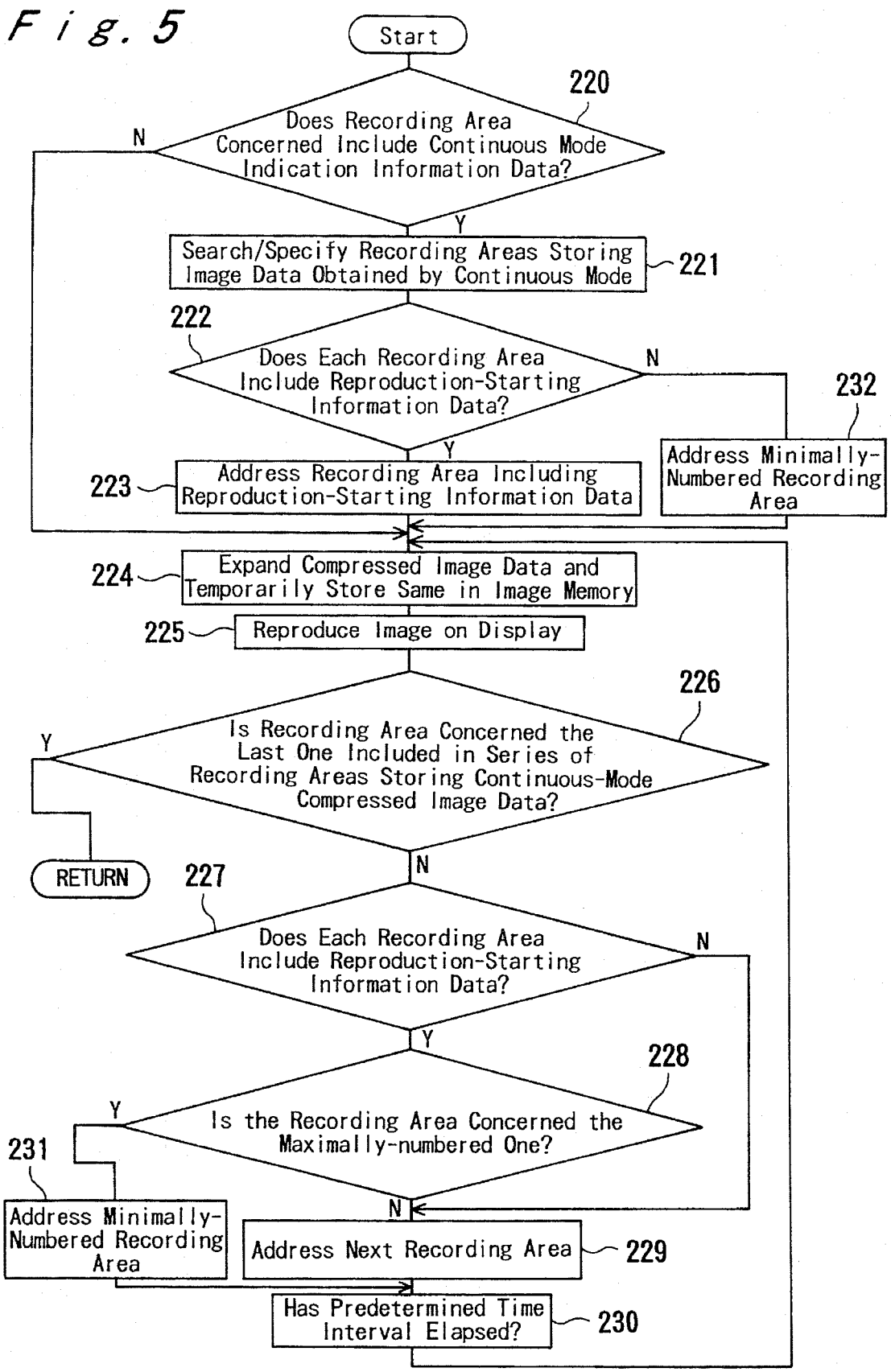
FIG. 5 is a flow chart forming a part of the flow chart of FIG. 4.

Then, control proceeds to step 203, where reproduction of an image is carried out on the basis of compressed image data stored in a recording area concerned. Step 203 comprises a subroutine of a flow chart, which is shown in FIG. 5.

At step 204, it is determined whether the image-reproduction switch of the control panel 21 is switched OFF. If the image-reproduction switch is switched ON, control proceeds to step 205, where it is determined whether or not a forward-switch of the control panel 21 is switched ON. Note, when the forward-switch is switched ON, the reproduction of images successively progresses in the forward direction (see, FIG. 2). At step 205, while the forward-switch is switched ON, control proceeds to step 209, where it is determined whether the reproduction of the image is based on the finally-stored compressed image data (corresponding to that stored in the eleventh recording area shown in FIG. 2). If the reproduction of the final image is not carried out, control proceeds to step 210, where the reproduction of images progresses by one step in the forward direction. Then, control returns to step 203. As long as the forward-switch is switched ON, steps 203, 204, 205, 209, and 210 are repeated until reproduction of the final image is completed. When reproduction of the final image is complete, control returns from step 209 to 204. Namely, reproduction of the final image is continued until the forward-switch is switched OFF.

At step 205, if it is determined that the forward-switch is switched OFF, control proceeds from step 205 to step 206, where it is determined whether a reverse switch of the control panel 21 is switched ON. Note, if the reverse switch is switched ON, reproduction of images successively progresses in the reverse direction (see, FIG. 2). At step 206, if the reverse switch is switched ON, control proceeds to step 207, where it is determined whether reproduction of the images is based on the initially-stored compressed image data (corresponding to that stored in the first recording area shown in FIG. 2). If reproduction of the initial image is carried out, control proceeds to step 208, where reproduction of the images progresses by one step in the reverse direction. Then, control returns to step 203. As long as the reverse-switch is switched ON, steps 203, 204, 205,206,207, and 208 are repeated until reproduction of the initial image is completed. When reproduction of the initial image is complete, control returns from step 207 to 204. Namely, reproduction of the initial image is continued until the reverse-switch is switched OFF. Note, the forward and reverse-switches cannot be simultaneously switched ON.

If the image-reproduction switch of the control panel 21 is switched OFF by the user, control proceeds from step 204 to step 211, where reproduction of image is stopped.

Referring to FIG. 5, at step 220, it is determined whether the recording area concerned includes the continuous-mode photographing indication information data written in the file header section H thereof. If the recording area concerned includes the continuous-mode photographing indication information data in the file header section H thereof, i.e., when the recording area concerned stores the compressed image data derived from an image photographed in either the normal continuous mode or the endless continuous mode, control proceeds to step 221, where a series of recording areas storing the compressed image data obtained by the continuous-mode photographing are searched and specified. Of course, the recording area concerned forms one element of the series of recording areas.

Then, control proceeds to step 222, where it is determined whether any one of the recording areas includes the reproduction-starting information data in the file header section H thereof. When one of the recording areas includes the reproduction-starting information data, this means that the compressed image data stored in the series of recording areas were derived from the images photographed in the endless continuous mode. Therefore control proceeds to step 223, where the recording area including the reproduction-starting information data, i.e., the oldest recording area, is addressed for reproduction of an image on the basis of the compressed image data stored therein.

At step 224, the compressed image data are fed from the recording area concerned to the data compression-expansion circuit 17 through the IC memory card control circuit 18, and are expanded to their original image data thereat. Then, the expanded image data are temporarily stored in the image memory 16. At step 225, the temporarily-stored image data are fed from the image memory 16 to the monitor (not shown) through the camera-process circuit 15, and thus the image is reproduced on the monitor.

At step 226, it is determined whether the recording area, from which the reproduced image is derived is the newest one included in the series of recording areas. For example, the example shown in Fig.-2, the tenth recording area corresponds to the newest recording area. Since the recording area concerned is not the newest one at this stage, control proceeds to step 227 (which is similar to step 222). Namely, at step 227, it is determined whether any one of the series of recording areas includes the reproduction-starting information data in the file header section H thereof. At this stage, since one of the series of the recording areas includes the reproduction-starting information data, i.e., since the compressed image data stored in the series of recording areas are derived from images photographed in the endless continuous mode, control proceeds to step 228, where it is determined whether the recording area, from which the reproduced image is derived, is the maximally-numbered one included in the series of the recording areas.

At step 228, if the recording area concerned is not the maximally-numbered one, control proceeds to step 229, where the next recording area is addressed for reproduction of an image on the basis of compressed image data stored therein. Then, control proceeds to step 230, where it is determined whether a predetermined period of time has elapsed. Note, this period of time corresponds to a time over which an image is reproduced on the basis of compressed image data stored in a recording area. When the period of time has elapsed, control returns to step 224, and thus the next image is reproduced on the basis of compressed image data included in the next recording area.

At step 228, if it is determined that the recording area concerned is the maximally-numbered one (corresponding to the tenth recording area shown in FIG. 2), control proceeds to step 231, where the minimally-numbered recording area (corresponding to the seventh recording area shown in Fig. 2) is addressed for reproduction of an image on the basis of compressed image data stored therein. Then, control proceeds to step 230, where it is determined whether the predetermined period of time has elapsed. If the period of time has elapsed, control returns to step 224, and thus the image is reproduced on the basis of compressed image data included in the minimally-numbered recording area.

At step 226, if it is determined that the recording area from which the reproduced image is derived is the newest one, i.e., when the reproduction of an image on the basis of compressed image data stored in the newest recording area is carried out, control returns from step 226 to step 203 of the flow chart shown in FIG. 4.

At step 222, if it is determined that none of the recording areas includes the reproduction-starting information data in the file header section H thereof, i.e., when compressed image data stored in the series of recording areas are derived from images photographed in the normal continuous mode, control proceeds to step 232, where the minimally-numbered recording area is addressed for reproduction of images on the basis of compressed image data included therein. Then, control proceeds to step 224 and 225, and the image is reproduced on the monitor.

At step 226, it is determined whether the recording area, from which the reproduced image is derived, is the newest one included in the series of recording areas. In the normal continuous mode, the newest recording area corresponds to the maximally-numbered recording area. In the example shown in FIG. 2, the sixth recording area corresponds to the newest or maximally-numbered recording area. At this stage, since the recording area concerned is not the newest one but the oldest or minimally-numbered one, control proceeds to step 227, at where it is determined whether any one of the series of recording areas includes the reproduction-starting information data in the file header section H thereof. Of course, none of the recording areas derived from images photographed in the normal continuous mode includes the reproduction-starting information data in the file header section H thereof. Thus, control proceeds from step 227 to step 229, where the recording area next to the oldest or minimally-numbered recording area is addressed for reproduction of an image on the basis of compressed image data stored therein. Then, control proceeds to step 230, where it is determined whether the predetermined period of time has elapsed. When the period of time has elapsed, control returns to step 224, and thus the next image is reproduced on the basis of compressed image data included in the next recording area.

At step 226, if it is determined that the recording area from which the reproduced image is derived is the newest or maximally-numbered one, i.e., when reproduction of an image on the basis of the compressed image data stored in the maximally-numbered recording area is carried out, control returns from step 226 to step 203 of the flow chart shown in FIG. 4.

At step 220, if it is determined that the file header section H of the recording area concerned does not include the continuous-mode photographing indication information data, i.e., when the recording area concerned stores the compressed image data derived from the image photographed in the single-normal mode, control proceeds from step 220 to steps 224 and 225, and thus the image is reproduced on the basis of the compressed image data included in the next recording area concerned. At step 226, it is determined whether the recording area from which the reproduced image is derived is the newest one. Nevertheless, in the single-normal mode, since the single recording area itself is deemed to be the newest one, control directly returns from step 226 to step 203 of the flow chart shown in FIG. 4.

Although the embodiments of the present invention have been described herein with reference to the accompanying drawings, obviously many modifications and changes may be made by those skilled in the art without departing from the scope of the invention.

The present disclosure relates to subject matter contained in Japanese Patent Application No. 6-66598 (filed on Mar. 10, 1994) which is expressly incorporated herein, by reference, in its entirety.

I claim:

1. A recording device, used in an electronic still camera, for recording image data derived from objects to be photographed in an over-writable memory means at regular predetermined time intervals, comprising:

release switch means for performing photographing operations;

means for setting a series of recording areas in said over-writable memory means, a plurality of said image data being recordable in said recording areas;

means for initiating a recording of said image data in said recording areas of said over-writable memory means by switching said release switch means ON, in such a manner that said image data are successively stored in said recording areas of said memory means; and means for repeating the recording of said image data in said memory means in an endless manner until said release switch means is switched OFF.

2. A recording device as set forth in claim 1, further comprising means for numbering said recording areas of said memory means in an order of the recording of said image data therein.

3. A recording device as set forth in claim 2, wherein a recording area of said memory means, in which said image data is recorded as the release switch means is switched OFF, is defined as a newest recording area, and a recording area next to said newest recording area is defined as an oldest recording area.

4. A recording device as set forth in claim 3, further comprising means for writing reproduction-starting information data in said oldest recording area, whereby a reproduction of an image is initially carried out based on said image data stored in said oldest recording area.

5. A recording device as set forth in claim 4, wherein said memory means comprises an IC memory card including an image-data storing section and a file header section, and said reproduction-starting information data are written in said file header section of said IC memory card.

6. A recording device as set forth in claim 1, further comprising means for compressing said image data before said image data is stored in a recording area of said memory means.

7. A recording device as set forth in claim 6, wherein said memory means comprises an IC memory card including an image-data storing section and a file header section, and the compressed image data is stored in the image data storing section of said IC memory card.

8. A reproduction device for reproducing an image based on the image data recorded in the memory means by a recording device as set forth in claim 1, comprising:

means for reading said image data from the recording areas of said memory means in an order of recording of said image data therein; and means for processing said read image data for successively reproducing a series of images based on said processed image data.

9. An electronic still camera, comprising:

means for photographing an object to output a plurality of image signals corresponding to said object;

a recording medium having a plurality of over-writable recording areas each of which can record one frame of said image signals;

means for recording said image signals outputted from said photographing means in said recording medium for each frame; and means for setting a series of the recording areas in which the plurality of said image signals are to be recorded, said setting means setting a recording area every time said recording means records said image signals corresponding to one frame, in such a manner that said recording area is cyclically changed within said plurality of the recording areas.

10. A recording device, for use in an electronic still camera, for recording a plurality of single-frames of image data derived from objects to be photographed in an over-writable memory means at regular predetermined time intervals, comprising:

release switch means for performing photographing operations;

means for setting a plurality of recording areas in said over-writable memory means for recording the plurality of single-frames of image data therein;

means for initiating a recording of the plurality of single-frames of image data in said plurality of recording areas of said over-writable memory means by switching said release switch means ON, such that the plurality of single-frames of image data are successively stored in said plurality of recording areas of said memory means; and means for repeating the recording of the plurality of single-frames of image data in said memory means in an endless manner until said release switch means is switched OFF.

11. A recording device as set forth in claim 10, further comprising means for numbering the plurality of recording areas in said memory means in an order of the recording of the plurality of single-frames of image data therein.

12. A recording device as set forth in claim 11, wherein a recording area of said memory means, in which a single-frame of image data is being recorded as the release switch means is switched OFF, is defined as a newest recording area, and a recording area adjacent to said newest recording area is defined as an oldest recording area.

13. A recording device as set forth in claim 12, further comprising means for writing reproduction-starting information data in said oldest recording area, wherein a reproduction of an image is initially carried out based on said image data stored in said oldest recording area.

14. A recording device as set forth in claim 13, wherein said memory means comprises an IC memory card including an image-data storing section and a file header section, said reproduction-starting information data are written in said file header section of said IC memory card.

15. A recording device as set forth in claim 10, further comprising means for compressing each of the plurality of single-frames of image data before each of the plurality of single-frames of image data is stored in a recording area of said memory means.

16. A recording device as set forth in claim 15, wherein said memory means comprises an IC memory card including an image-data storing section and a file header section, and wherein the compressed image data is stored in said image data storing section of said IC memory card.

17. A reproduction device for reproducing an image based on a single-frame of image data recorded in the over-writable memory means by a recording device as set forth in claim 10, further comprising:

means for reading the plurality of single-frames of image data from the plurality of recording areas of said memory means in an order of recording of the plurality of single-frame of image data therein; and means for processing each of the plurality of single-frames of image data read by said reading means for successively reproducing a series of frame images based on said processed image data.

18. An electronic still camera, comprising:

means for photographing an object to output a plurality of single-frames of image signals corresponding to said object;

a recording medium having a plurality of over-writable recording areas, each of said over-writable recording areas recording a single-frame of said image signals;

means for recording the single-frame of image signals outputted from said photographing means in said recording medium; and means for setting the plurality of recording areas in which the plurality of single-frames of said image signals are to be recorded, said setting means setting a recording area as said recording means records the single-frame of image signals, such that said recording area is cyclically changed within said plurality of the recording areas.

* * * * *